United States Patent
Symons et al.

(10) Patent No.: US 9,497,204 B2
(45) Date of Patent: Nov. 15, 2016

(54) IN-SITU TRAINABLE INTRUSION DETECTION SYSTEM

(71) Applicant: UT Battelle, LLC, Oak Ridge, TN (US)

(72) Inventors: Christopher T. Symons, Oak Ridge, TN (US); Justin M. Beaver, Oak Ridge, TN (US); Rob Gillen, Oak Ridge, TN (US); Thomas E. Potok, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 122 days.

(21) Appl. No.: 14/468,000

(22) Filed: Aug. 25, 2014

(65) Prior Publication Data
US 2015/0067857 A1 Mar. 5, 2015

Related U.S. Application Data

(60) Provisional application No. 61/872,047, filed on Aug. 30, 2013.

(51) Int. Cl.
*H04L 29/06* (2006.01)
*G06N 99/00* (2010.01)
*G06N 5/04* (2006.01)

(52) U.S. Cl.
CPC ........... *H04L 63/1416* (2013.01); *G06N 5/043* (2013.01); *G06N 99/005* (2013.01); *H04L 63/1441* (2013.01)

(58) Field of Classification Search
CPC G06N 5/043; G06N 99/005; H04L 63/1441; H04L 63/1416
USPC ........................................................ 726/23
See application file for complete search history.

(56) References Cited

U.S. PATENT DOCUMENTS

| | | | |
|---|---|---|---|
| 7,181,768 B1 | 2/2007 | Ghosh et al. | |
| 7,784,099 B2 | 8/2010 | Benjamin | |
| 8,527,432 B1* | 9/2013 | Guo | G06N 99/005 706/12 |
| 9,112,895 B1* | 8/2015 | Lin | H04L 63/1416 726/22 |
| 2007/0289013 A1 | 12/2007 | Lim | |
| 2008/0184371 A1 | 7/2008 | Moskovitch et al. | |
| 2008/0201278 A1 | 8/2008 | Muller et al. | |
| 2010/0153316 A1 | 6/2010 | Duffield et al. | |
| 2011/0004935 A1 | 1/2011 | Moffie et al. | |

(Continued)

OTHER PUBLICATIONS

Christopher Krugel, "Bayesian Event Classification for Intrusion Detection," Reliable Software Group, University of California, Santa Barbara, {chris, dhm, wkr, Fredrik}@cs.ucsb.edu, Undated, 10 pages.

(Continued)

*Primary Examiner* — Baotran N To
(74) *Attorney, Agent, or Firm* — Brinks Gilson & Lione

(57) ABSTRACT

A computer implemented method detects intrusions using a computer by analyzing network traffic. The method includes a semi-supervised learning module connected to a network node. The learning module uses labeled and unlabeled data to train a semi-supervised machine learning sensor. The method records events that include a feature set made up of unauthorized intrusions and benign computer requests. The method identifies at least some of the benign computer requests that occur during the recording of the events while treating the remainder of the data as unlabeled. The method trains the semi-supervised learning module at the network node in-situ, such that the semi-supervised learning modules may identify malicious traffic without relying on specific rules, signatures, or anomaly detection.

19 Claims, 5 Drawing Sheets

| Classifier | Recall | False Positive Rate | AUC Score |
|---|---|---|---|
| Signature IDS | 0.09004 | 0.01619 | N/A |
| Multi-Classifier AD | 0.8093 | 0.0590 | N/A |
| Maximum Entropy | 0.77292 | 0.02059 | 0.72044 |
| Linear SVM | 0.96354 | 0.03029 | 0.94802 |
| Laplacian RLS | 0.89144 | 0.02667 | 0.98651 |

(56) References Cited

U.S. PATENT DOCUMENTS

2011/0320387 A1   12/2011   He et al.
2012/0210423 A1   8/2012    Friedrichs et al.
2014/0283052 A1*  9/2014    Jordan .................. G06F 21/562
                                                        726/23

OTHER PUBLICATIONS

Chris Sinclair, "An Application of Machine Learning to Network Intrusion Detection," Applied Research Laboratories, The University of Texas at Austin, sinlcair@arlut.utexas.edu, Undated, 7 pages.

* cited by examiner

| Classifier | Recall | False Positive Rate | AUC Score |
|---|---|---|---|
| Signature IDS | 0.09004 | 0.01619 | N/A |
| Multi-Classifier AD | 0.8093 | 0.0590 | N/A |
| Maximum Entropy | 0.77292 | 0.02059 | 0.72044 |
| Linear SVM | 0.96354 | 0.03029 | 0.94802 |
| Laplacian RLS | 0.89144 | 0.02667 | 0.98651 |

FIGURE 1

| Classifier | Recall | False Positive Rate | AUC Score |
|---|---|---|---|
| Signature IDS* | 0.00000 | 0.01619 | N/A |
| Laplacian RLS | 0.99975 | 0.02538 | 0.99987 |

FIGURE 2

| Classifier | # Training Data | Recall | # False Negatives | # False Positives | AUC Score |
|---|---|---|---|---|---|
| Signature IDS* | N/A | 0.00000 | 398 | 13,074 | N/A |
| Laplacian RLS 1 | 19 | 0.99749 | 1 | 178 | 0.99968 |
| Laplacian RLS 2 | 57 | 1.0 | 0 | 14,753 | 0.99993 |
| Laplacian RLS 3 | 58 | 1.0 | 0 | 28,498 | 0.99992 |
| Laplacian RLS 4 | 60 | 1.0 | 0 | 28,498 | 0.99970 |
| Laplacian RLS 5 | 64 | 1.0 | 0 | 25,621 | 0.99993 |
| Laplacian RLS 6 | 65 | 1.0 | 0 | 17,456 | 0.99993 |
| Laplacian RLS 7 | 59 | 1.0 | 0 | 18,278 | 0.99986 |
| Laplacian RLS 8 | 69 | 1.0 | 0 | 28,498 | 0.99986 |
| Laplacian RLS 9 | 57 | 1.0 | 0 | 28,498 | 0.99995 |
| Laplacian RLS 10 | 58 | 1.0 | 0 | 14,707 | 0.99995 |

FIGURE 3

| Classifier | Recall | False Positive Rate | AUC Score |
|---|---|---|---|
| IDS | 0.00000 | 0.01619 | N/A |
| Laplacian RLS | 0.99749 | 0.00166 | 0.99987 |

FIGURE 4

| Classifier | # Training Data | Recall | # False Negatives | # False Positives | AUC Score |
|---|---|---|---|---|---|
| Signature IDS* | N/A | 0.00000 | 398 | 13,074 | N/A |
| Laplacian RLS 1 | 19 | 0.99749 | 1 | 164 | 0.99968 |
| Laplacian RLS 2 | 57 | 0.99749 | 1 | 173 | 0.99993 |
| Laplacian RLS 3 | 58 | 0.99749 | 1 | 676 | 0.99992 |
| Laplacian RLS 4 | 60 | 0.99749 | 1 | 9807 | 0.99970 |
| Laplacian RLS 5 | 64 | 0.99749 | 1 | 166 | 0.99993 |
| Laplacian RLS 6 | 65 | 0.99749 | 1 | 167 | 0.99993 |
| Laplacian RLS 7 | 59 | 0.99749 | 1 | 1779 | 0.99986 |
| Laplacian RLS 8 | 69 | 0.99749 | 1 | 166 | 0.99986 |
| Laplacian RLS 9 | 57 | 0.99749 | 1 | 203 | 0.99995 |
| Laplacian RLS 10 | 58 | 0.99749 | 1 | 151 | 0.99995 |

FIGURE 5

IN-SITU TRAINABLE INTRUSION DETECTION SYSTEM

PRIORITY CLAIM

This application claims the benefit of priority from U.S. Provisional Application No. 61/872,047 filed Aug. 30, 2013, entitled "Method and Device for In-Situ Trainable Intrusion Detection System" which is incorporated herein by reference.

STATEMENT REGARDING FEDERALLY SPONSORED RESEARCH AND DEVELOPMENT

The invention was made with United States government support under Contract No. DE-AC05-00OR22725 awarded by the United States Department of Energy. The United States government has certain rights in the invention.

BACKGROUND

Technical Field

This disclosure relates to security, and particularly to a network intrusion detection systems and methods.

Related Art

Many systems attempt to detect unauthorized intrusions through rule-based tools to detect expert-derived signatures or anomaly-based processes that compare behavior to a baseline behavior. Both approaches require human analysts to detect and identify the significance and nature of one or more intrusions after the intrusions occur. Further, each exploit may have a number of signatures or variations in behavior making it difficult to identify particular patterns of traffic that are common to the intrusions. Another problem in detecting unauthorized intrusions is that some malicious traffic is not abnormal and some non-malicious traffic tends to be anomalous. As a result, prior art computer based intrusion detection systems may be ineffective and render a high number of false positive alerts.

BRIEF DESCRIPTION OF THE DRAWINGS

FIG. 1 shows initial experimental IDS detection results versus other state-of-the-art methods.

FIG. 2 shows the identified alerts of previously unknown attacks and the false positive rate versus Signature IDS.

FIG. 3 shows the performance of the individual classifiers that were averaged to obtain the overall result in FIG. 2.

FIG. 4 shows the IDS results generated with an automated threshold adjustment and the false positive rate versus Signature IDS.

FIG. 5 shows the individual classifiers that were averaged to obtain the overall result in FIG. 4 using small training sets with an automated threshold adjustment.

DETAILED DESCRIPTION OF THE PREFERRED EMBODIMENTS

To protect computer networks and machines from unauthorized intrusions, the disclosed devices and methods provide alerts when an exploit is detected. The disclosed Intrusion Detection Systems and Methods (IDSs) require few training samples and can be trained in a cost-effective manner in-place (i.e., in-situ) and in real-time on a new or existing publicly accessible or private network. The IDSs may detect previously unidentified attacks (which are not detected by signature or anomaly based IDSs) while generating fewer false positive alerts than signature and anomaly based IDS systems. This is an improvement over the prior art since signature based IDSs only key on known attacks and prior-art anomaly detection or heuristic sensors suffer from false positive rates that are significantly higher than those of signature-based systems. With this capability, the disclosed IDS may be incorporated or comprise a machine-learning sensor in-situ (meaning where it will be deployed) and some may be configured in a short period of time such as a day, for example. The resulting sensor offers very strong defense against unknown exploits for which there was previously no proven defense.

The IDSs are trained in the place that they are deployed. The systems and methods use semi-supervised learning to render very accurate detectors with low false positive rates. When training, the IDSs use a very small number of labelled intrusions and normal connections, while augmenting this information with other network information that are processed as unlabelled. The systems leverage the availability of the unlabelled activity in the training process without assuming that the activity is normal or part of an attack.

Some IDSs make use of advanced semi-supervised learning such as a Laplacian Regularized Least Squares model or an Alternating Structure Optimization (ASO) model. The ASO model performs well when the amount of unlabelled data is particularly large and the feature space is high dimensional. Selected semi-supervised learning may depend on the choice of features, choice of event definition, etc. In this disclosure an event is any collection of features that quantify what has occurred in a network, on a host, etc. over a specified period of time. The time period may be an n-second time window or may be based on the period in which a network connection is sustained.

The architecture of the IDS is an extension of the pipes and filters design pattern where data processing components are chained such that each component benefits from the processing performed by the previous component. The data object operated on by each component in this disclosure is a feature set, which is a data representation in machine learning. Network data/packet data/host data is acquired, and flow, host, and network features are derived from this data as the base feature set. Each component or stage in the pipeline augments the feature set in order to optimize the number and type of features for the target operational environment. In-situ training is accomplished with this architecture by storing acquired feature sets at the point in the pipeline where an IDS learner is to be trained, labelling the feature sets, and processing the feature set as the basis for building the generalized model.

The IDS pipeline architecture extension offers several flexibilities that allow for multiple embodiments of this technology. Machine learning IDS classifiers and feature augmenting IDS components can be assigned to any location in the network or computer pipeline and even in parallel with other network or computer components. This allows for the IDS learner modules to be staged in an optimum configuration to maximize the overall classification performance. In addition, the flexibility of the pipeline architecture allows for components to be added and removed as is necessary to produce a system that maximizes detection accuracy for a target operational environment.

As described, the IDS learner modules execute a semi-supervised learning that uses both labeled and unlabeled data during the model discovery process. Methods for incorporating the unlabeled information may include use of data-dependent priors and low-density separation. Some alternate approaches are graph-based. The graph-based methods recognize that the data naturally occurs on an underlying manifold, such that the true degrees of freedom of the problem can be discovered using unlabeled data. The system seeks to find structure in the ambient space that can be exploited to constrain the search for a good model. One set of approaches uses the graph Laplacian. In this approach a graph is constructed to represent a manifold (or densely populated region of interest in the ambient space), and the graph Laplacian can either be used to facilitate the discovery of a low-dimensional space that is smooth with respect to this graph or it can be used as a regularization term that penalizes models that disagree with the graph.

Specifically, some IDS use the graph Laplacian for semi-supervised learning. And, more specifically may use a Laplacian Eigenmap or the Laplacian Regularized Least Squares algorithm. An exemplary IDS uses a Laplacian Eigenmap as an alternate nonparametric semi-supervised learner. The IDS learner is constructed by processing a nearest neighbor graph using the six nearest neighbors based on cosine similarity. Alternative systems may use any number of its nearest neighbors, for example it may use five or eight. In addition, the cosine similarity may be replaced by many similarity metrics (e.g., Euclidean distance, Mahalanobis distance, etc.). Unlike some nonlinear dimensionality reduction methods, the use of Laplacian Eigenmaps does not automatically suggest the size of the new space. In this IDS the system retains a basis size that is a percentage of the labeled data size, with 20% being a baseline number. In alternative systems the basis size may be smaller or larger. It is worth noting that in addition to the non-parametric nature of the nearest neighbor graph, the number of dimensions is a reflection of the labeled data size. In this case, the complexity of the model can grow with the size of the unlabeled data through the graph Laplacian, and it can also grow with the size of the labeled data.

The normalized graph Laplacian is a matrix expressed as equation (1)

$$\mathcal{L}(u,v) = \begin{cases} 1, & \text{if } u = v \text{ and } d_v \neq 0 \\ \dfrac{-1}{\sqrt{d_u d_v}}, & \text{if } u \text{ and } v \text{ are adjacent} \\ 0, & \text{otherwise} \end{cases} \quad (1)$$

where u and v are vertices in the graph, d is the degree (number of incident edges) of a vertex, and adjacency refers to a neighboring connection in the graph. The un-normalized form is expressed as equation (2):

$$L(u,v) = \begin{cases} d_v, & \text{if } u = v \\ -1, & \text{if } u \text{ and } v \text{ are adjacent} \\ 0, & \text{otherwise} \end{cases} \quad (2)$$

Using the eigenvalues and associated eigenvectors of these positive, semi-definite, symmetric matrices provides a method for discovering dimensions that are smooth with respect to the graph that defines it. If the graph varies smoothly with respect to the target problem (i.e., examples from different classes or clusters are rarely linked, similar examples from the perspective of the target problem are linked, etc.), then it can be used to represent a manifold. The Laplacian of the graph may be used to find a space that roughly represents that manifold. The eigenvector associated with the smallest non-zero eigenvalue is smoothest with respect to the graph, such that points connected in the graph will be close together in the dimension defined by the eigenvector. This smoothness with respect to eigenvector-defined dimensions decreases as you progress to the larger eigenvalues.

A useful property of the eigenvalue system is that the number of zero-value eigenvalues is equal to the number of connected components in the graph. In addition, an eigenvector will not involve more than one component of the graph. Thus, after counting the number of connected components, which is an O(n) operation, the system retains at least that many dimensions in a new space in order to distinguish between all points after they are mapped.

For some semi-supervised test models, dimensionality is reduced and an initial transductive model is constructed. A simple classifier is constructed in the new space, in which the coefficients for the new dimensions are set by minimizing the sum of squared error on the labeled data. In other words, the weights of the new dimensions are given by the vector "a" by equation (3).

$$a = (EE^T)^{-1} Ec \quad (3)$$

where c is a vector representing the class labels, $\lambda_k$; $v_k$ are the k-th eigenvalue and eigenvector, respectively, the entries of E are $\lambda_k v_{i,k}$, i is the index of the labeled point in the matrix, and k is the index in the new low-dimensional space; i.e. the k-th eigenvalue and eigenvector provide the mapping into the new space for labeled point i. The number of connected components in the graph is determined in order to eliminate the zero-valued eigenvalues, and then the mapping starts with the next eigen-function.

As explained above, the Laplacian-Eigenmap based semi-supervised learning is transductive, meaning that it only creates a mapping for an unlabeled example if it was part of the set used for graph construction. This means that applying a method transductively involves solving the eigenvalue problem for any new point or set of points, which may be impractical in some cases for intrusion detection in real time. For a nonparametric out-of-sample extension that allows efficient application to new points, the Nystrom Formula is used. The method provides inductive classifications results with no significant difference in accuracy from the transductive application. It uses the Laplacian matrix as a data-dependent Kernel function $K_D$ in the following equation (4) in order to map a new point into each dimension k of the new decision space:

$$f_k(x) = \frac{\sqrt{n}}{\lambda_k} \sum_{k=1}^{n} v_{ik} K_D(x, x_i) \quad (4)$$

where n is the size of the original dataset, and $\lambda_k$; $v_k$ are the k-th eigenvalue and eigenvector, respectively.

To implement the Laplacian RLS model, the system and method may use the normalized or unnormalized forms. One exemplary unormalized form may use the graph Laplacian, here as shown in equation (5).

$$L(u,v) = \begin{cases} d_v, & \text{if } u = v \\ -1, & \text{if } u \text{ and } v \text{ are adjacent} \\ 0, & \text{otherwise} \end{cases} \quad (5)$$

where d is the degree (number of incident edges) of a vertex, and adjacency refers to a neighboring connection in the graph. The output function that is learned is shown as equation (6):

$$f(x) = \sum_{i=1}^{l+u} \alpha_i K(x_i, x). \quad (6)$$

where K is the (l+u)×(l+u) Gram matrix over labeled and unlabeled points, and α is the following learned coefficient vector shown in equation (7).

$$\alpha = \left(JK + \gamma_A lI + \frac{\gamma_I l}{(l+u)^2}LK\right)^{-1} Y, \quad (7)$$

with L being the Laplacian matrix described above, I being the (l+u)×(l+u) identity matrix, J being the (l+u)×(l+u) diagonal matrix with the first l diagonal entries equal to 1 and the rest of the entries equal to 0, and Y being the (l+u) label vector, $Y=[y_i; \ldots; y_1; 0; \ldots; 0]$. The Laplacian RLS model implementation has two parameters that control the amount of regularization. These can be chosen via a model selection technique, such as cross-validation. In an exemplary implementation, $$\gamma_A l = 0.005,$$

$$\frac{\gamma_I l}{(l+u)^2} = 0.045.$$

IDS pipeline architecture, IDS learner modules (e.g., machine learning classifiers), etc., may be implemented in or may be interfaced in many ways in many different combinations of hardware, software or both and may be applied to different applications. All or parts of the system may be executed through one or more programs executed by controllers, one or more microprocessors (CPUs), one or more signal processors (SPU), one or more application specific integrated circuit (ASIC), one or more programmable media or combinations of such hardware. All or part of the systems may be implemented as instructions or programs stored on a non-transitory medium (e.g., a machine readable medium) or memory executed by a CPU/SPU/ASIC that comprises electronics including input/output interfaces, application program interfaces, and an up-dateable memory comprising at least a random access memory and/or flash memory which is capable of being updated via an electronic medium and which is capable of storing updated information, processors (e.g., CPUs, SPUs, and/or ASICs) controller, an integrated circuit that includes a microcontroller or other processing devices that may execute software stored on a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, includes a specifically programmed non-transitory storage medium and computer readable instructions stored on that medium, which when executed, cause the control system to perform the specially programmed operations.

The IDS described are preferably trained where the IDS is used. This means an IDS using semi-supervised learning may be red-teamed by penetration testers in its deployment environment to allow the model to be trained effectively. Benign activities may be identified as such and labeled as normal to add to the attack data and generate the IDS model's training set. By taking advantage of the consistent availability of large amounts of unlabeled data and incorporating said data in a manner consistent with the principles outlined above, very little labeled data is required to train effective detection models. The cost-savings in terms of labeling requirements associated with the described IDS allow the described IDS to be economically trained in-situ. In turn, this in-situ training allows a machine-learning-based IDS to obtain high detection rates with extremely low false positive rates. As seen in FIG. 1, as expected, the tested signature IDS has a significantly lower false positive rate than the supervised learners (i.e., Linear SVM and Maximum Entropy) and the state-of-the-art multi-classifier anomaly detection, while also lacking significant coverage.

Comparing the results of an unmodified semi-supervised Laplacian Regularized Least Squares (RLS) model to the supervised learners using small labeled datasets shows significant differences too, with an AUC (Area Under the ROC Curve) score that indicates the Laplacian RLS has the most potential for reducing the false positive rate without sacrificing the high detection rate. Subsets of 100 labeled examples and approximately 3000 unlabeled examples were used for training, and testing was performed across test data spanning 12 days of network traffic. There were 111,589 examples (terminated connections) in the original training set that were reduced to a smaller set by removing samples that were essentially redundant based on the chosen feature set. The classification results were averaged over 10 random selections of the labeled data. The evaluation randomly selected 100 examples as a labeled training set with the rest retained as unlabeled examples for use by the semi supervised learner.

The evaluation removed redundancy through an approximate similarity measure by hashing the examples based on label value, binary feature values, and 10% ranges of the normalized numeric feature values. This left an average of 56.6 labeled examples per test, with a high of 69 and a low of 19. It also preserved approximately 3000 unlabeled examples per test. The evaluation purposely restricted the number of labeled examples to an extreme number to demonstrate the viability of training such models in their deployment environments.

An exemplary training method for an IDS may include coupling a recording device to a port (such as a tap) that records and calculates the observations that make up the feature set. While it is recording, red-team or penetration testers may assess security by attacking the network using a specified set of attacks (which may be benign as executed or reversible to minimize harm). During the attack, threat actors, equipment, or techniques may identify some benign behaviors that occur during the training period and provide a key to the times, machines, flows, etc. involved in the attacks and identify normal activities. The recorded data is then aggregated into a training data set. The training data set may include classification labels for the events whose classifications are known (e.g. attack and normal), and treat or label the rest of the data as unlabeled. The semi-supervised learners of the IDS are trained on the device or on a companion server cluster or heavy computer machine. The IDS are programed to cap the false positive rate alerts by adjusting the learner's alerting threshold to fall below that rate on the training data.

When training an IDS some optional guidelines may be followed. For example, the semi-supervised machine-learning sensors of the IDS may be positioned where the sensor may monitor network traffic, preferably at a major access point on the digital or computer network. Multiple sensors in different positions may also be used in alternative systems and methods. In some training sessions, the training data may be deduplicated to control data classes and relative sample sizes within each class. In this training data duplicates or near duplicate events are deleted from training data to allow the use of a more diverse unlabeled example set, which can improve performance, etc.

When training the semi-supervised machine-learning sensors the threats may provide the time, the source and destination IP addresses, and the source and destination ports of the attack to the semi-supervised machine-learning sensors to allow the sensors to generate and store network statistics for these events and label them as example "attacks". The statistics may capture in a local or remote memory the time, the source and destination IP addresses, and the source and destination ports of some confirmed normal connections, and label them as "normal", when the designation applies. The sensors may collect statistics for a large set of events on the network, and treat these examples as "unlabeled" events. Some alternative systems create statistical features that characterize new events that occur on the network in the same manner as used to create the training examples. Here the semi-supervised machine-learning sensors may model new events into "normal" or "attack" categories.

In use the recording device continuously records and converts observations into the event definition. The IDS uses the trained model to classify these events as they occur and generates and transmits an alert when the classification is an attack class by providing a log message, etc. Some IDS may send an alert to a user interface to report any events that were categorized as "attacks."

FIG. 2 shows the ability of the Laplacian RLS learner to catch unknown attacks after being trained on normal traffic and known attacks only. The setup is the same with the results being averaged over 10 random selections of the labeled data. Each set has 100 labeled data points total to begin with, thus after eliminating redundancy, leaves a combined total of under 70 labeled examples (combined number of normal and known-attack terminated connections) for each classifier, with as few as 19 labeled examples. Again, there are approximately 3000 unlabeled examples per test. The table counts how often the IDS results recorded in the dataset alerted on the data with normal and unknown attacks only. There are a total of 398 unknown attacks that occur during the 12 days in the test set.

A closer look at the individual results shows some of the benefits of the Laplacian RLS, and other semi-supervised methods. FIG. 3 shows the results of each of 10 runs in order to demonstrate how low the number of false positives can be bounded. The first run has the lowest AUC score of 0.99968, but has the lowest false positive rate of 0.00022 (out of 808,108 normal events). It is also the only classifier to have a recall of less than 100%, but it still catches 99.75% of the unknown attacks. The binary Laplacian RLS model uses a threshold, so the AUC score indicates how much tradeoff needs to occur between precision and recall. Therefore, since the model that catches 397 unknown attacks, while missing only one, only has 178 false positive alerts and yet has the lowest AUC score, all of the other models should be tunable to allow them to miss a single attack while keeping their false positive number at 178 or lower, as well, since they require less of a tradeoff than the first model. Given the AUC scores in FIG. 3, some IDS include an automatic threshold selection routine to the training step in order to obtain better performance. FIGS. 4 and 5 show the results of the Laplacian RLS classifiers when the thresholds are adjusted during training (on training data) to eliminate false positives. In this example, all labeled training data is ranked by the score assigned by the model, and a threshold that will target a maximum false positive rate of 0.00000001 is programmed based on the training data. Knowing the distance between this discovered threshold and the maximum score of 1, it is then multiplied it by a constant 0.75, and added to the old threshold to obtain a new adjusted threshold. The constant of 0.75 may be based on empirical evaluations and may be adjusted manually or automatically. In summary, the self-learning models are very powerful in identifying unknown attacks for the defense of large networks. An optimal threshold for each learner may assure fewer than 178 false positives, for example, for any of the classifiers.

Other IDS and applications may be formed from combinations of structure and functions described and used in other applications. For example, some IDS may process host-level, packet level, and/or network level information. Examples of host-level information include sequences of system calls, system processor loads, log file information, information from malware detection software on the host, etc. Examples of packet level information include things like packet size, binary encodings as observations, functional analysis of packet info, malware detection results on packet, etc. In these alternative systems the IDS may process any combination of feature types, aggregate the features together, may separate features into views (e.g. host-level view, packet-level view, and network-level view), and apply view-based semi-supervised learning. In some IDS applications, the detection and/or transmission of the alerts may occur when a threshold is reached or exceeded. The threshold may be programmed (manually or automatically) to a predetermined level that the user desires at the model building stage or deployment stage. Some alternative IDS may use a tweaked learner, e.g., a method that wraps the internal learner and has a designated, desired maximum false positive rate that is used to adjust the alerting threshold by ranking the training data and setting a threshold that limits the false positive rate to the desired level on the training data, which is expected to translate to some degree to the alerting on the test data.

Other models and alerting tools can be used as features in the training. One or more anomaly detectors may also communicate with the IDS (for example, we used an Active Outlier Anomaly Detection model in some of our tests), but it is understood that their baseline may reflect attacks. In these systems the IDS (which are neither anomaly detectors nor rule based signature systems) may ignore the anomaly detector outputs if the detection is not consistent with the semi-supervised model. In yet another alternative IDS, multiple semi-supervised learning sensors or instances of sensors may be used. When multiple instances of the semi-supervised learning sensors are used the sensors may be run on separate processors to distribute the workload. The sensors may be staged at different locations in the processing pipeline such that the sensors can communicate between themselves and have access to other information from the sensors. In these systems the sensors may detect discrete events or temporal sequences of events. Some of the sensors may process multi-class detection models or binary. In yet another alternative, multiple semi-supervised learning sensors can be trained for different portions of the network, and multiple devices can be used at different points. The semi-supervised learning sensors may be trained to detect all intrusion types and/or subsets. Multi-class semi-supervised learning sensors can provide a ranking for each decision with each type of behavior being assigned a probability. Some IDS may provide an automated response. A low false positive rate allows for automated intervention when an attack is detected.

In yet other alternative IDS, the IDS may dynamically evolve to predict network traffic it normally observes and determine when the network data has changed enough that the semi-supervised learning sensors should be retrained. The network tools that may be included in this embodiment may have an interactive function where an analyst can label false positives as such, or correctly identified attacks as such, and this information can be added to the training set for retraining to provide an improved model. An active learning algorithm can also be employed in the initial setup stages to allow the setup team or IT team to label events selected by the machine to further optimize the semi-supervised learning sensors and limit the number of training examples required to build an effective sensor. In some other alternative IDS, the IDS may be executed on a specialized processor, with training either on chip or off, even on a completely separate device if large-scale training options are needed. The IDS may be synced remotely with a large cluster for any updates or retraining (e.g., the device could send out to the cluster or large machine new unlabeled data periodically, too). In these systems the IDS may access an attack library (e.g., a collection of software routines stored in memory) with pre-scripted options that can be used to do the red-teaming against the network where it is being trained and deployed. When training the systems may use parallel processing, so the device itself or the training device (if separated) can consist of any of a number of parallel processing setups. The IDS may operate at multiple scales of network data rates, may operate on multiple operating system platforms and interact with a variety of commercially available network interfaces.

Commercial application of the IDS sensors may render obsolete many of the current software tools and devices now being used to protect networks. The cost of training in place of the disclosed IDS is minimal, and much less than the cost of a missed attack, which may be missed because it wasn't detected or because it wasn't investigated because the existing technology may render a high false positive rate. In some applications the disclosed IDS may serve a large network. In an exemplary application the device observes traffic when in place. The device may identify a sufficient (small) number of network flows that are normal and benign activities on their network. In training a red-teaming is performed by either the support or IT team to provide examples of a small number of attacks of the type they want to identify. For example, maybe they don't want the device to alert on probes, only on exploits, so they use a variety of exploits run against the network. These known behaviors, the normals, and the attacks, are labeled as such for the device, and the machine-learning detection model for the device is then trained either on a separate, more powerful machine, or on the device itself. The deployed device then uses this model to make alerting decisions.

The term "coupled" disclosed in this description may encompass both direct and indirect coupling. Thus, first and second parts are said to be coupled together when they directly communicate with one another, as well as when the first part couples to an intermediate part which couples either directly or via one or more additional intermediate parts to the second part. The term "analyst" encompasses an expert system that performs or executes an analysis. The term "substantially" or "about" may encompass a range that is largely, but not necessarily wholly, that which is specified. It encompasses all but a significant amount. When modules or components of the IDS are responsive to events, the actions and/or steps of devices, such as the operations that other devices are performing, necessarily occur as a direct or indirect result of the preceding events and/or actions. In other words, the operations occur as a result of the preceding operations. A device that is responsive to another requires more than an action (i.e., the device's response to) merely follow another action. When IDS operate in real-time, the operation may match a human's perception of time or a virtual process that is processed at the same rate (or perceived to be at the same rate) as a physical or an external process (e.g., such as at the same rate as the monitored system). The physical or external process is defined by the computing session in which data is received and/or processed or during the time in which a program is running that begins when the data is received.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer implemented method that detects intrusions using a computer by analysing network traffic comprising:
   coupling a semi-supervised learning module to a network node that uses labeled and unlabeled data to train a semi-supervised machine learning sensor;
   recording events that comprise a feature set that include unauthorized intrusions and benign requests;
   identifying at least some of the benign behavior that occurs during the recording of the events while treating the remainder of the data as unlabeled; and
   training the semi-supervised learning module at the network node in-situ, such that the computer implemented method including the semi-supervised learning module is configured to identify the malicious traffic without relying on specific rules, signatures, or an anomaly detection;
   where the semi-supervised machine learning sensor comprises an extension of a plurality of pipelines and filters and the feature set is stored in one of the plurality of pipelines that the semi-supervised learning module is trained.

2. The computer method of claim 1 further comprising programming the semi-supervised machine learning sensor to transmit an alert when a threshold is exceeded.

3. The computer method of claim 1 where the semi-supervised machine learning sensor further comprises a plurality of sensors coupled to a plurality of network nodes that process network traffic.

4. The computer method of claim 1 where the feature set comprises data that identifies the time the data was received, the source and destination IP addresses, and the source and destination ports of the data seeking unauthorized intrusions.

5. The computer method of claim 1 where the semi-supervised learning module comprises a Laplacian Regularized Least Squares model.

6. The computer method of claim 1 further comprising storing the feature set comprising network data, packet data, and host data at the node it is received.

7. The computer method of claim 1 further comprising a plurality of semi-supervised learning modules that train a semi-supervised machine learning sensor staged at different locations of the plurality of pipelines and filters.

8. The computer method of claim 1 further comprising generating a ranking of the intrusion types and a corresponding probability of the respective occurrences.

9. The computer method of claim 1 further comprising programming a threshold that indicates a detected unauthorized intrusion.

10. The computer method of claim 9 where the automated detection causes an automated intervention against the intrusion.

11. The computer method of claim 1 further comprising retraining the semi-supervised learning module by interactively modifying training set data accessed by the semi-supervised learning module.

12. The computer method of claim 11 where the training set of data comprises a computer library comprising computer scripts.

13. The computer method of claim 11 where the semi-supervised learning module is executed on a parallel processor.

14. The computer method of claim 1 where the semi-supervised machine learning sensor communicates with an anomaly detector.

15. A system that detects intrusions using a computer by analysing network traffic, comprising:
    a network node;
    a semi-supervised learning module coupled to the network node that uses labeled and unlabeled data to train a semi-supervised machine learning sensor;
    a recorder that records events that comprise a feature set that include unauthorized intrusions and benign requests; and
    a computer readable medium programmed to:
    identify at least some of benign behavior that occurs during the recording of the events while treating the remainder of the data as unlabeled; and
    train the semi-supervised learning module at the network node in-situ, such that the system including the semi-supervised learning module is configured to identify malicious traffic without relying on specific rules, signatures, or anomaly detection;
    where the semi-supervised machine learning sensor comprises an extension of a plurality of pipelines and filters and the feature set is stored in at least one of the plurality of pipelines that the semi-supervised learning module is trained.

16. The system of claim 15 where the semi-supervised machine learning sensor is configured to transmit an alert when a threshold is exceeded.

17. The system of claim 15 where the semi-supervised machine learning sensor further comprises a plurality of sensors coupled to a plurality of network nodes that process network traffic.

18. The system of claim 15 where the feature set comprises data that identifies the time the data was received, the source and destination IP addresses, and the source and destination ports of the data seeking unauthorized intrusions.

19. The system of claim 15 where the semi-supervised learning module comprises a Laplacian Regularized Least Squares model.

* * * * *